３,005,023
PRODUCTION OF TETRACYCLINE
Philip Andrew Miller, New City, N.Y., assignor to American Cyanamid Company, New York, N.Y., a corporation of Maine
No Drawing. Filed Apr. 5, 1957, Ser. No. 650,822
7 Claims. (Cl. 260—559)

This invention relates to a novel method for the production of tetracycline.

At the present time, tetracycline is produced commercially generally in one of two ways. The method most widely in use today involves the reductive dechlorination of chlortetracycline.

Conventionally, this process is carried out by reducing chlortetracycline with hydrogen in the presence of metallic palladium or platinum on a charcoal catalyst. The reduction is usually carried out in an organic solvent for the chlortetracycline, such as the lower aliphatic alcohols, glycol ethers and the like. Solvents such as 2-ethoxyethanol, 2-methoxyethanol, n-butanol, methanol, ethanol and mixtures thereof have been used. The reaction may be carried out at temperatures of from 0° to 100° C. and at hydrogen pressures of the order of 15–60 lbs. per square inch absolute. Usually an acid acceptor such as triethylamine or other organic base is present in the reaction mixture in a quantity sufficient to combine with all of the hydrochloric acid liberated by the hydrogenolysis reaction so that the tetracycline is produced and recovered as the free base. After the reduction to tetracycline is complete, the catalyst is filtered off, the filtrate containing the activity is acidified, seeded and aged and tetracycline hydrochloride is crystallized therefrom. A hydrogenolysis procedure, as outlined above, is more particularly described in J.A.C.S. 75, 4621 (1953).

The other general method involves the direct fermentation of tetracycline by microorganisms of the species *Streptomyces aureofaciens* in an aqueous nutrient medium low in available chloride whereby yields of both tetracycline and chlortetracycline are produced with the tetracycline being the predominant product of the fermentation. Such a fermentation procedure is described in the U.S. Patent to Minieri et al. No. 2,734,018.

The present invention is based upon the discovery that it is possible to produce tetracycline in commercially useful quantities by the catalytic reduction of the new tetracycline antibiotics described in the abandoned application of John A. Growich and Philip A. Miller, Serial Number 650,821, filed concurrently herewith. As described more in detail in the aforesaid copending application, the new tetracycline antibiotics such as 7-chloro-5a(11a)-dehydrotetracycline, for example, are produced by a fermentation process with certain new mutant strains of *S. aureofaciens*, some of which have been designated as S1308, S1308–29, S1308–V146, and S1308–V237, cultures of which have been deposited with the American Type Culture Collection in Washington, D.C., where they have been assigned ATCC accession numbers 12748, 12749, 12750 and 12751, respectively.

The detailed discussion which follows will be principally concerned with the catalytic reduction to tetracycline of 7-chloro-5a(11a)-dehydrotetracycline since it may be potentially the most useful antibiotic produced by fermentation with the new mutant strains of *S. aureofaciens*. However, it is to be understood that the catalytic reduction to tetracycline may be carried out with equal facility with the other new tetracyclines described in the aforesaid copending application, namely 5a(11a)-dehydrotetracycline and 7-bromo-5a(11a)-dehydrotetracycline as well as the three epimers of each of these new antibiotics.

In carrying out the present invention, 7-chloro-5a(11a)-dehydrotetracycline, for example, is catalytically reduced by contacting a solution of the antibiotic in a polar solvent, and having a finely-divided catalyst such as metallic palladium or other metal of the platinum family on charcoal suspended therein, with hydrogen until approximately two moles of hydrogen have been absorbed. The reduction may be carried out at temperatures ranging from 0° C. to 100° C. and at pressures of from one-half to 100 atmospheres. Useful polar solvents for the reaction are dimethylformamide, lower aliphatic alcohols such as ethanol, n-butanol, etc. and lower alkoxy lower alkanols such as 2-methoxyethanol, 2-ethoxyethanol, etc. and mixtures thereof with the lower alkanols. Dimethylformamide appears to be the solvent of choice as the reaction is normally complete within about 45 minutes. The butanol lower alkoxy lower alkanol system is considerably slower, usually requiring about 18 hours at room temperature for completion.

The reduction of 7-chloro-5a(11a)-dehydrotetracycline invariably yields two products, one of course, being tetracycline as described, and the other is a new compound which has been designated as 5a-epitetracycline. This new compound has the following structural formula:

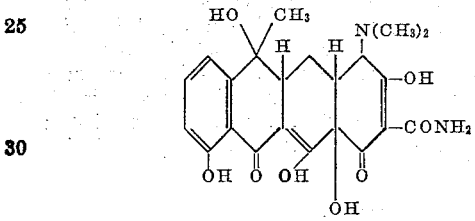

and according to Chemical Abstracts nomenclature has the same systematic name as that of tetracycline. A common name, as indicated above, would be 5a-epitetracycline and it will be so referred to herein.

The antibacterial activity of this new tetracycline analog is quite low. However, it may be converted by an acid degradation process in 80–90% yields to the useful product known as anhydrotetracycline which is an antibacterial agent effective against certain tetracycline-resistant and chlortetracycline-resistant strains of bacteria. Anhydrotetracycline is more particularly described and claimed in the U.S. patent to Waller et al. No. 2,744,932.

The recovery of tetracycline from the reduced solution of 7-chloro-5a(11a)-dehydrotetracycline may be accomplished in any convenient manner; as by filtering the reduced solution to remove the catalyst and vacuum concentrating the solution to dryness. The residue is dissolved in water or alcohol, seeded and aged whereupon crystals of tetracycline neutral precipitate therefrom. It is particularly fortuitous that 5a-epitetracycline does not tend to co-crystallize with the tetracycline either as the hydrochloride or as the neutral. Thus no problem is presented in recovering commercially useful quantities of tetracycline from the reduced solution. When it is desired to isolate the 5a-epitetracycline, column chromatography on Celite using a butanol-chloroform system is usually required.

As indicated above, 5a(11a)-dehydrotetracycline and 7-bromo-5a(11a)-dehydrotetracycline may be similarly reduced to tetracycline in substantially the same manner as described in detail in conjunction with 7-chloro-5a-(11a)-dehydrotetracycline. When the unchlorinated and bromo analogs are reduced to tetracycline, there is also produced quantities of the new compound 5a-epitetracycline, the same as described in connection with the reduction of 7-chloro - 5a(11a) - dehydrotetracycline and which may be separated from the tetracycline as described above.

The invention will be described in greater detail in conjunction with the following specific examples in which the yields are expressed in gammas per milligram (γ/mg.).

Example 1

1 gram of 7-chloro-5a(11a)-dehydrotetracycline neutral, produced as described in the aforesaid copending application and assaying 1000γ/mg. is dissolved in 6 milliliters of dimethylformamide, and 0.56 milliliter of triethylamine is added to the solution. 500 milligrams of 5% palladium on carbon is added, and the mixture is shaken in a hydrogen atmosphere at room temperature for 45 minutes until two moles of hydrogen have been absorbed. The reduced solution is diluted with 6 milliliters of dimethylformamide, filtered to remove the catalyst, and vacuum-concentrated to dryness. A minimum quantity of water is added to dissolve the residue, and the resulting solution is seeded with tetracycline neutral to induce crystallization. After aging for two hours at room temperature, the crystals are filtered, washed with water, and vacuum-dried to yield 0.4 gram of tetracycline neutral assaying 900γ/mg.

Example 2

1 gram of tetracycline neutral, prepared by the reduction process of Example 1, is dissolved in a minimum volume of n-butanol previously adjusted to pH 1.5 with concentrated hydrochloric acid. The solution is seeded with tetracycline hydrochloride and aged for four hours to permit crystallization to occur. The product is filtered, washed with butanol, then with ether, and dried in vacuo to yield 0.76 gram of tetracycline hydrochloride assaying 994γ/mg.

Example 3

A mixture of 50 milliliters of n-butanol, 50 milliliters of 2-ethoxyethanol, 0.6 milliliter of water, and 0.6 milliliter of triethylamine is prepared. In 12 milliliters of the mixture, 188 milligrams of 7-chloro-5a(11a)-dehydrotetracycline neutral assaying 1000γ/mg. is dissolved, and 94 milligrams of 5% palladium on carbon is added. Reduction is carried out by shaking in a hydrogen atmosphere at room temperature for 18 hours. After filtering to remove the catalyst, the reduced solution is vacuum-concentrated into water, and the aqueous solution is freeze-dried. The residue is dissolved in a minimum volume of water-saturated butanol which is acidified to pH 1.5 with concentrated hydrochloric acid. The solution is seeded with tetracycline hydrochloride to promote crystallization, and after aging, the crystals are filtered, washed first with butanol, then ether, and then vacuum-dried. A yield of 45 milligrams of tetracycline hydrochloride assaying 985γ/mg. is obtained.

Example 4

The mother liquor from Example 3 is put on a 1"-diameter 70 gram Celite column buffered with 35 milliliters 0.01 N HCl. An 80% butanol-20% chloroform mixture equilibrated with 0.01 N HCl is used to develop the column. Cuts of 10 milliliters each are taken. Cuts 4–8 are vacuum-concentrated into water, and the aqueous solution is freeze-dried. Crystallization of the amorphous residue is accomplished by dissolving it in a minimum quantity of butanol, adjusting to pH 1.5 with concentrated hydrochloric acid, and adding two volumes of ether to form an amorphous precipitate which after seeding crystallizes on aging for 3 hours at room temperature. The crystals are filtered, washed with pH 1.5 2:1 butanol:ether, then with ether, and vacuum-dried to yield 25 milligrams of 5a-epitetracycline hydrochloride.

Analysis.—Calculated for $C_{22}H_{25}N_2ClO_8 \cdot H_2O$: C, 52.9; H, 5.42; N, 5.61; Cl, 7.11; O, 28.8. Found: C, 53.12; H, 5.33; N, 5.36; Cl, 7.41; O, 28.75.

Example 5

A solution of 200 milligrams of 5a-epitetracycline prepared as in Example 4, in 0.6 milliliter of concentrated hydrochloric acid is heated at 60° C. for 5 minutes. To the solution are added 1.5 milliliters of n-butanol, 0.4 milliliter of water, and 2.5 milliliters of acetone. The solution is seeded with anhydrotetracycline hydrochloride and aged for 16 hours at room temperature, after which the crystalline product is filtered, washed with acetone, and vacuum-dried to yield 145 milligrams of anhydrotetracycline hydrochloride.

The identity of the product is verified by comparison of its infrared spectrum and its acid and alkaline ultraviolet spectra with standard anhydrotetracycline curves.

Example 6

The procedure of Example 1 is followed except that 5a(11a)-dehydrotetracycline is used as the starting material. Tetracycline is produced.

Example 7

The procedure of Example 1 is followed except that 7-bromo-5a(11a)-dehydrotetracycline is used as the starting material. Tetracycline is produced.

Examples 8–10

The procedure of Example 1 is followed except that 7-chloro-5a(11a)-dehydro-4-epitetracycline, 5a(11a)-dehydro-4-epitetracycline, and 7-bromo-5a(11a)-dehydro-4-epitetracycline are used, respectively, in a series of separate reductions. 4-epitetracycline is produced in all instances.

I claim:

1. The process of producing tetracycline which comprises contacting with hydrogen an inert polar organic solvent solution of a compound of the formula:

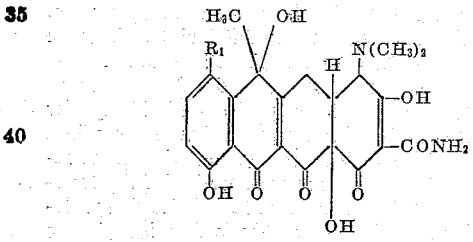

wherein $R_1$ is a member of the group consisting of hydrogen, bromine and chlorine at a temperature within the range of 0° C. to 100° C. and in the presence of a finely-divided noble metal catalyst until approximately 1 mole of hydrogen is absorbed when $R_1$ is hydrogen and until aproximately 2 moles of hydrogen have been absorbed when $R_2$ is a member of the group consisting of bromine and chlorine and recovering the tetracycline thus formed.

2. The process according to claim 1 in which the polar solvent is dimethylformamide.

3. The process according to claim 1 in which the catalyst is metallic palladium.

4. The process of producing tetracycline which comprises contacting an inert polar organic solvent solution of 7-chloro-5a(11a)-dehydrotetracycline with hydrogen at a temperature within the range of 0° C. to 100° C. and in presence of a finely-divided noble metal catalyst until approximately 2 moles of hydrogen have been absorbed for each mole of 7-chloro-5a(11a)-dehydrotetracycline used, and recovering the tetracycline thus formed.

5. The process according to claim 4 in which the polar solvent is dimethylformamide.

6. The process according to claim 4 in which the catalyst is metallic palladium.

7. The process of catalytically reducing the 5a(11a) double bond of a 5a(11a)-dehydrotetracycline which comprises contacting an inert polar organic solvent solution of a 5a(11a)-dehydrotetracycline with hydrogen at a temperature within the range of 0° C. to 100° C. and in the presence of a finely-divided noble metal catalyst until approximately 2 moles of hydrogen have been absorbed for each mole of starting material used when the starting compound is substituted in the 7-position with a member of the group consisting of chlorine and bromine, and until approximately one mol of hydrogen is absorbed when no halogen substituent is present in the 7-position.

References Cited in the file of this patent

UNITED STATES PATENTS

| 2,712,517 | Gourevitch | July 5, 1955 |
| 2,731,497 | McCormick | Jan. 17, 1956 |

FOREIGN PATENTS

| 167,750 | Australia | May 25, 1956 |

OTHER REFERENCES

Gailliot: Compt. Rend., 27° Cong. Intern. Chem. Ind. (Brussels), pages 506–8 (1954).

Mfg. Chemist, "Antibiotics," vol. 26, page 550 (1955).

Doerschuk et al.: JACS 77, page 4687 (1955).

Stephens et al.: JACS 78, pages 1515–1516, April 5, 1956.

McCormick et al.: J. Am. Chem. Soc., vol. 79, pp. 2849–2850 (June 1957).